US006968927B2

(12) United States Patent
Scura

(10) Patent No.: US 6,968,927 B2
(45) Date of Patent: Nov. 29, 2005

(54) BICYCLE FORCE BALANCING MECHANISM WITH A BRAKE ARM ACTUATION ASSEMBLY AND A PIVOT MEMBER FOR DUAL MAIN BRAKE CABLE SEGMENTS

(76) Inventor: Brian Scura, 24058 Skyline, Mission Viejo, CA (US) 92692

( * ) Notice: Subject to any disclaimer, the term of this patent is extended or adjusted under 35 U.S.C. 154(b) by 0 days.

(21) Appl. No.: 10/684,010

(22) Filed: Oct. 10, 2003

(65) Prior Publication Data

US 2005/0077120 A1 Apr. 14, 2005

(51) Int. Cl.[7] .................................................. B62L 3/00
(52) U.S. Cl. .............................. 188/24.16; 188/24.12; 188/24.21; 188/2 D; 74/500.5; 74/501.5 R; 74/502.6
(58) Field of Search .......................... 188/24.18, 24.11, 188/24.12, 24.21, 24.16, 2 D; 74/502.6, 502.2, 74/501.5 R, 500.5

(56) References Cited

U.S. PATENT DOCUMENTS 4,896,750 A * 1/1990 Tseng ...................... 188/24.19
5,431,255 A * 7/1995 Tsuchie ................... 188/24.16
5,758,749 A 6/1998 Wu
5,803,207 A 9/1998 Nielsen
5,829,314 A 11/1998 Scura
6,164,153 A 12/2000 Scura
6,186,282 B1 * 2/2001 Juan ........................ 188/24.16
6,311,805 B1 * 11/2001 Juan ........................ 188/24.16
6,439,800 B1 8/2002 Chen
6,523,649 B1 * 2/2003 Juan ........................ 188/24.16
6,634,467 B2 * 10/2003 Liu ......................... 188/24.16
6,662,675 B2 * 12/2003 Lee et al. .................. 74/500.5

FOREIGN PATENT DOCUMENTS

JP 3-79486 A * 4/1991 .............. 188/24.21

* cited by examiner

*Primary Examiner*—Robert A. Siconolfi
*Assistant Examiner*—Mariano Sy
(74) *Attorney, Agent, or Firm*—Stetina Brunda Garred & Brucker

(57) ABSTRACT

A dual cable force balancing mechanism for use with a pair of main brake cable segments and a pair of rear brake arms of a bicycle. The dual cable force balancing mechanism includes a brake arm actuation assembly defining a longitudinal axis positionable between the main brake cable segments. The brake arm actuation assembly is attachable to the rear brake arms. The dual cable force balancing mechanism further includes a pivot member including main attachment portions disposed about the longitudinal axis for respectively attaching the main cable segments. The pivot member is rotatably coupled to the brake arm actuation assembly for pivoting the pivot member with respect to the longitudinal axis.

19 Claims, 4 Drawing Sheets

BICYCLE FORCE BALANCING MECHANISM WITH A BRAKE ARM ACTUATION ASSEMBLY AND A PIVOT MEMBER FOR DUAL MAIN BRAKE CABLE SEGMENTS

BACKGROUND OF THE INVENTION

1. Field of the Invention

The present invention relates generally to bicycle braking systems, and in particular to a bicycle force balancing mechanism with a brake arm actuation assembly and a pivot member for dual main brake cable segments.

2. Description of the Prior Art

Bicycle trick or stunt riding has placed specialized requirements upon the design of rear brake assemblies. A rear brake assembly of a bicycle includes a rear hand brake lever mounted upon handlebars of the bicycle. The rear brake assembly further includes a pair of brake arms mounted to a bicycle frame for braking of a rear wheel of the bicycle. The brake arms are commonly of a U-brake configuration. Some form of cabling interconnects the rear hand brake lever to the brake arms. Squeezing of the rear hand brake lever imparts tension into such cabling which results in actuation of the brake arms. In this regard, brake pads are attached to each brake arm and are cooperatively configured to apply forces against rear wheel in a pinching manner for braking of the rear wheel. Design focus has been placed upon the cabling configuration between the rear hand brake lever and the rear brake arms.

Use of a cable detangler or cable decoupler allows for riders to do various tricks involving spinning of the handlebars without limitations of the brake cabling being twisted about the base of the handlebars after only a single rotation. As such, trick or BMX style bicycles are characterized as having a rear brake assembly with such a cable detangler. A cable detangler typically includes a detangler ball bearing set with inner and outer races. Squeezing of the rear hand brake lever pulls upon a cable (sometimes two cables) that terminates at one of the races of the detangler ball bearing set. A pair of rear main brake cables is routed to extend from the other race rearward along the bicycle frame to the rear brake arms. This configuration is commonly referred to as a dual rear brake cable configuration. As such, it is understood that the cable detangler allows for transmission of the cable tension initiated by the squeezing of the rear brake lever through the cable detangler while freeing the handlebars to spin in relation to the bicycle frame.

During a trick involving spinning of the handlebars, the inner and outer races of the cable detangler may tend to reciprocally "flop" or snap from position to position associated with the limits of such "play" in the ball bearing races. This flopping impairs the smooth spinning of the handlebars and often results in jerky movement and an undesirable audible clicking. Accordingly, there is a need in the art for an improved bicycle rear brake assembly configuration in comparison to the prior art.

SUMMARY OF THE INVENTION

An aspect of the present invention can be regarded as a dual cable force balancing mechanism for use with a pair of main brake cable segments and a pair of rear brake arms of a bicycle. The dual cable force balancing mechanism includes a brake arm actuation assembly defining a longitudinal axis positionable between the main brake cable segments. The brake arm actuation assembly is attachable to the rear brake arms. The dual cable force balancing mechanism further includes a pivot member including main attachment portions disposed about the longitudinal axis for respectively attaching the main cable segments. The pivot member is rotatably coupled to the brake arm actuation assembly for pivoting the pivot member with respect to the longitudinal axis.

It is contemplated that dual cable force balancing mechanism may be used with a bicycle having a cable detangler for allowing handlebars of the bicycle to freely rotate. The dual cable force balancing mechanism may be installed with the main brake cable segments connected to the cable detangler. The present invention recognizes that unequal tension in the main brake cable segments is a significant underlying cause of the cable flop phenomenon associated with the cable detangler when the handlebars are fully rotated. Such unequal tension may be a result of relative unequal lengths of the main brake cable segments that may result from loose manufacturing tolerances, improper installation, and defects in and wear of the various brake assembly components. The pivot member allows for the dual cable force balancing mechanism to "actively" compensate or adjust for unequal lengths of the main brake cable segments during rotation of the handlebars of the bicycle. This allows for the transmission of force between the dual cable force balancing mechanism and the cable detangler substantially equally through the two main brake cable segments to mitigate the cable flop phenomenon.

According to various embodiments, the brake arm actuation assembly may include a pair of rear brake cable segments attachable to the rear brake arms. Each of the rear brake cable segments is disposed in mechanical communication with the pivot member. The brake arm actuation assembly may further include a hanger body. The hanger body is rotatably coupled to the pivot member. The hanger body includes rear attachment portions respective positionable about the longitudinal axis. The rear brake cable segments are attached to the hanger body respectively at the rear attachment portions. The hanger body may include a lip with the rear attachment portions disposed along the lip. The rear brake cable segments may be integrated into a single cable and the lip may be configured to engage the rear brake cable segments with the rear brake cable segments being looped about the lip. The hanger body may include a pivot member support and the lip may extend from the pivot member support. In another arrangement, the pivot member support includes first and second plates, and the lip extends between the first and second plates. The pivot member may be rotatably connected to and between the first and second plates. The rear brake cable segments may be rotatably attached to the hanger body respectively at the rear attachment portions. In an embodiment, the pivot member is a cross bar having opposing ends and a central portion. The pivot member is attached to the hanger body at the central portion, and the main attachment portions are respectively disposed adjacent the opposing ends. In another embodiment, the pivot member is a pulley and includes a central portion. The pivot member is attached to the hanger body at the central portion. The dual cable force balancing mechanism may further include a fastener rotatably coupling the pivot member to the hanger body. The main brake cable segments may be integrated into a single cable, and the pivot member is configured to engage the main brake cable segments with the main brake cable segments being looped about the pivot member. The pivot member includes a pivot pin element disposed between the main attachment portions and positionable orthogonal to the longitudinal axis, and the rear brake cable segments are joined at the pivot pin element. In an embodiment, the rear brake cable segments are cooperatively looped over the pivot pin element. In another embodiment, the rear brake cable segments are cooperatively wound about the pivot pin element. The rear brake cable segments may take the form of a single spring wire. The pivot member may be rotatably attachable to the main brake cables.

According to another aspect of the invention, there is provided a bicycle. The bicycle includes a bicycle frame and a rear wheel supported by the bicycle frame. The bicycle further includes a rear brake assembly. The rear brake assembly includes a rear brake lever and a pair of main brake cable segments in mechanical communication with the rear brake lever. The rear brake assembly further includes a pair of rear brake arms in operable communication with the rear wheel. The rear brake assembly further includes a dual cable force balancing mechanism. The dual cable force balancing mechanism includes a brake arm actuation assembly defining a longitudinal axis positioned between the main brake cable segments. The brake arm actuation assembly is attached to the rear brake arms. The dual cable force balancing mechanism further includes a pivot member including main attachment portions disposed about the longitudinal axis. The main cable segments are respectively attached to the pivot member at main attachment portions, the pivot member being rotatably coupled to the brake arm actuation assembly for pivoting the pivot member with respect to the longitudinal axis.

According to various embodiments, the dual cable force balancing mechanism may include a pair of rear brake cable segments attached to the rear brake arms. Each of the rear brake cable segments is disposed in mechanical communication with the pivot member. The dual cable force balancing mechanism may be as described above. Further, the bicycle frame may include a seat post portion, and the dual cable force balancing mechanism may be disposed between the seat post portion and the rear brake arms.

DESCRIPTION OF THE PREFERRED EMBODIMENTS

Figure 1:
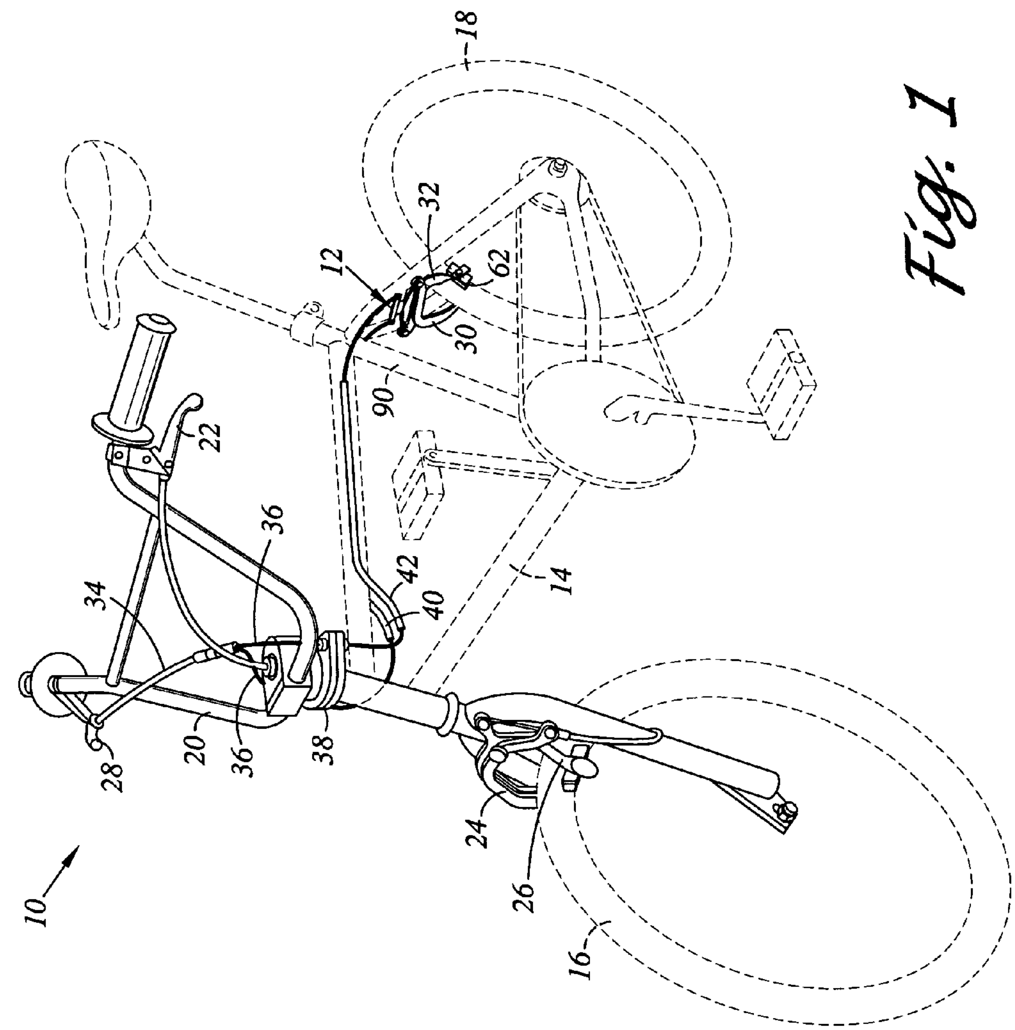
FIG. 1 is a perspective view of a bicycle including a dual cable force balancing mechanism in accordance with an aspect of the present invention.

Referring now to the drawings wherein the showings are for purposes of illustrating preferred embodiments of the present invention only, and not for purposes of limiting the same, FIGS. 1–10 illustrate a bicycle with rear brake related elements in accordance with the aspects of the present invention.

Referring now to FIG. 1, there is depicted a perspective view of a bicycle 10 including a dual cable force balancing mechanism 12 in accordance with an aspect of the present invention. For ease of illustrating the present invention selected portions of the bicycle 10 are shown in phantom lining. The bicycle 10 includes a bicycle frame 14. The bicycle frame 14 supports front and rear wheels 16, 18. Handlebars 20 are rotatably coupled to the bicycle frame 14. A front brake lever 22 is mounted to the handlebars 20. The front brake lever 22 is cable connected to front brake arms 24, 26 which are configured to apply a braking force to the front wheel 16. A rear brake lever 28 is further mounted to the handlebars 20. The rear brake lever 28 is cable connected to a pair of rear brake arms 30, 32 that are configured to apply a braking force to the rear wheel 18.

Figure 3:
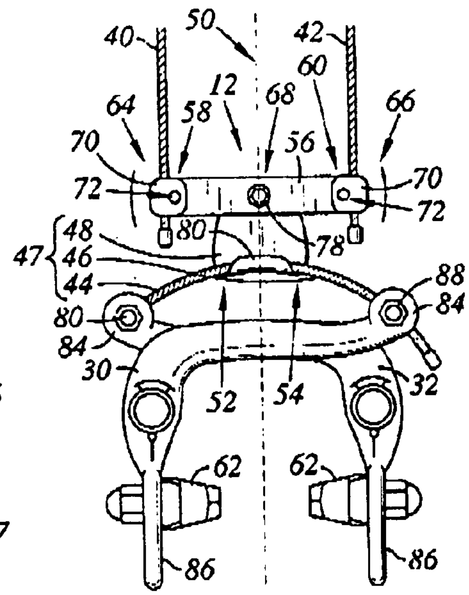
FIG. 3 is a plan view of the dual cable force balancing mechanism of FIG. 1 as assembled, as shown with portions of the main brake cable segments, the rear brake cable segments, and rear brake arms.

In the embodiment shown, a rear brake lever cable 34 is attached to the rear brake lever 28. The rear brake cable 34 is split into a pair of segments 36. As is common with BMX style bicycles, at a base of the handlebars 20 adjacent the bicycle frame 14 there is provided a cable detangler 38. The cable detangler 38 allows for riders to do various tricks involving spinning of the handlebars 20 without limitations of the rear brake cabling being twisted about the base of the handlebars 20 after only a single rotation. The cable detangler 38 may include a detangler bearing set with inner and outer races. As seen in FIG. 3, the rear brake arms 30, 32 each include brake pads 62 which are configured to engage the rear wheel 18. Squeezing of the rear brake lever 28 pulls upon the rear brake cable 34 and the segments 36 that are attached to one of the races of the cable detangler 38. A pair of main cable segments 40, 42 is attached to the other race of the cable detangler 38. This configuration is commonly referred to as a dual rear brake cable configuration. The main brake cable segments 40, 42 are routed to extend from the cable detangler 38 rearward along the bicycle frame 14 in mechanical communication with the rear brake arms 30, 32. As such, it is understood that the cable detangler 38 allows for transmission of the cable tension initiated by the squeezing of the rear brake lever 28 through the cable detangler 38 while freeing the handlebars 20 to spin in relation to the bicycle frame 14.

Figure 2:
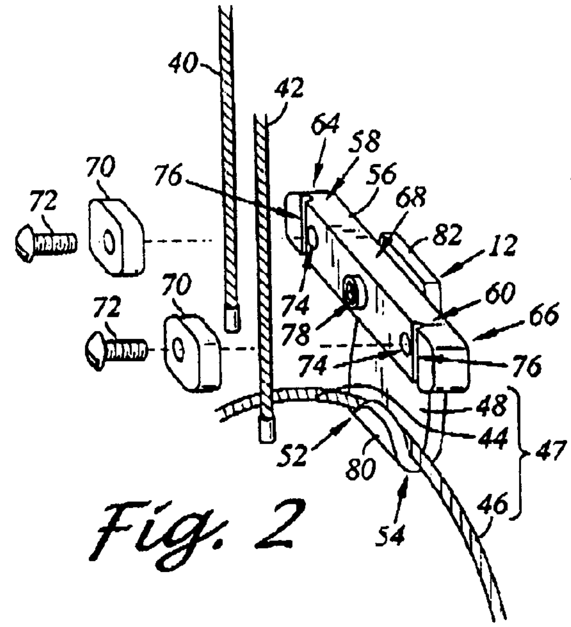
FIG. 2 is an enlarged exploded perspective view of the dual cable force balancing mechanism of FIG. 1 as shown with portions of main brake cable segments and portions of rear brake cable segments.

Referring now to FIG. 2 there is depicted an enlarged exploded perspective view of the dual cable force balancing mechanism 12 of FIG. 1 as shown with a portion of the main brake cable segments 40, 42 and portions of a pair rear brake cable segments 44, 46 of the pair of rear brake arms 30, 32 of the bicycle 10. Referring additionally to FIG. 3 there is depicted a plan view of the dual cable force balancing mechanism 12 of FIG. 1 as assembled, as shown along with portions of the main brake cable segments 40, 42, the rear brake cable segments 44, 46, and the rear brake arms 30, 32.

An aspect of the present invention can be regarded as the dual cable force balancing mechanism 12 for use with the pair of main brake cable segments 40, 42 and the pair of rear brake arms 30, 32 of the bicycle 10. The dual cable force balancing mechanism 12 includes a brake arm actuation assembly 47 defining a longitudinal axis 50 positionable between the main brake cable segments 40, 42. The brake arm actuation assembly 47 is attachable to the rear brake arms 30, 32. The dual cable force balancing mechanism 12 further includes a pivot member 56 including main attachment portions 58, 60 disposed about the longitudinal axis 50 for respectively attaching the main brake cable segments 40, 42. The pivot member 56 is rotatably coupled to the brake arm actuation assembly 47 for pivoting the pivot member 56 with respect to the longitudinal axis 50.

It is contemplated that dual cable force balancing mechanism 12 may be used with the bicycle 10 having the cable detangler 38 for allowing the handlebars 20 of the bicycle 10 to freely rotate. The dual cable force balancing mechanism 12 may be installed with the main brake cable segments 40, 42 connected to the cable detangler 38. The present invention recognizes that unequal tension in the main brake cable segments 40, 42 and/or unequal tension in the rear brake cable segments 36 is/are a significant underlying cause of the cable flop phenomenon associated with the cable detangler 38 when the handlebars 20 are fully rotated. Such unequal tension may be a result of relative unequal lengths of the main brake cable segments 40, 42 and/or unequal relative lengths of the rear brake cable segments 36 that may result from loose manufacturing tolerances, improper installation, and defects in and wear of the various brake assembly components. The pivot member 56 allows for the dual cable force balancing mechanism 12 to "actively" compensate or adjust for unequal lengths of the main brake cable segments 40, 42 and/or unequal relative lengths of the rear brake cable segments 36 during rotation of the handlebars 20 of the bicycle 10. The pivot action of the pivot member 56 is indicated in FIG. 3 with the curved double-headed arrows. This pivot action allows each of the two main brake cable segments 40, 42 to transmit a substantially equal force from the cable detangler 38 to the brake arm actuation assembly 47 and ultimately to each brake arm 30, 32 to mitigate the cable flop phenomenon. As such, the pivot action allows the dual cable force balancing mechanism 12 to perform a force balancing in the transfer of tension initiated by the pulling of the rear brake lever 28 to actuate the rear brake arms 30, 32.

In further detail according to various embodiments, the main brake cable segments 40, 42 are formed and routed to be generally parallel adjacent the dual cable force balancing mechanism 12. The main brake cable segments 40, 42 are engaged with the dual cable force balancing mechanism 12 with the main brake cable segments 40, 42 adjacent the dual cable force balancing mechanism 12 being generally aligned with the longitudinal axis 50.

The main brake cable segments 40, 42 may be engaged to the pivot member 56 in a variety ways. In this regard, in the embodiment shown, the pivot member 56 takes the form of a cross bar having opposing ends 64, 66 and a central portion 68. The main attachment portions 58, 60 are respectively disposed adjacent the opposing ends 64, 66. A fitting 70 is attached to each of the opposing ends 64, 66 with a fastener 72. The fittings 70 and the pivot member 56 are cooperatively configured to respectively capture and clamp the main brake cable segments 40, 42 at the main attachment portions 58, 60. The fasteners 72 may each be received in fastener engagement holes 74 formed in the pivot member 56. The main attachment portions 58, 60 may each include a groove 76 as shown in FIG. 2. Each groove 76 is formed to respectively accommodate and receive the main brake cable segments 40, 42 for secure engagement and desired positioning of the main brake cable segments 40, 42.

Though not shown it is contemplated that the main brake cable segments 40, 42 may include barrel adjusters at either of their ends to adjust the relative lengths of the main brake cable segments 40, 42 so as to fine tune the tension in the main brake cable segments 40, 42. However, it is understood that the incorporation of the pivot element 56 and its pivoting action advantageously compensates for differential relative lengths in the main brake cable segments 40, 42 to maintain a substantially equal tension.

The brake arm actuation assembly 47 may include the pair of rear brake cable segments 44, 46. The rear brake cable segments 44, 46 may be attachable to the rear brake arms 30, 32. Each of the rear brake cable segments 44, 46 may be disposed in mechanical communication with the pivot member 56. The brake arm actuation assembly 47 may further include a hanger body 48. The hanger body 48 is rotatably coupled to the pivot member 56. The hanger body includes rear attachment portion 52, 54 respectively positionable about the longitudinal axis 50. The rear brake cable segments 44, 46 are attached to the hanger body 48 respectively at the rear attachment portions 52, 54.

The pivot member 56 may be attached to the hanger body 48 at the central portion 68. This may be accomplished through any number of ways. For example, as shown a fastener 78 is disposed through the pivot member 56 at the central portion 68 and is engaged with the hanger body 48.

The hanger body 48 may include a lip 80. The rear attachment portions 52, 54 are disposed along the lip 80. In this regard, the rear attachment portions 52, 54 take the form of curved surfaces along an inner portion of the lip 80. The hanger body 48 may further include a pivot member support 82 and the lip 80 may extend from the pivot member support 82. The hanger body 48, in particular the pivot member support 82, may be integrally formed with the lip 80. The rear brake cable segments 44, 46 may be integrated into a single cable. The lip 80 may be configured to engage the rear brake cable segments 44, 46 with the rear brake cable segments 44, 46 being looped about the lip 80.

As shown in FIG. 3, the rear brake cable segments 44, 46 are respectively attached to the rear brake arms 30, 32. In this regard, the rear brake arms 30, 32 may each include a cable end 84 and an opposing brake pad end 86. The brake pad ends 86 each respectively support the brake pads 62. Fasteners 88 may be used to clamp down and attach the rear brake cable segments 44, 46 to the cable ends 84. It is contemplated that the rear brake cable segments 44, 46 may be integrally formed as shown.

According to another aspect of the present invention, there is provided the bicycle 10 including the bicycle frame 14, the rear wheel 18 supported by the bicycle frame 14, and a rear brake assembly including the rear brake lever 28, the main brake cable segments 40, 42, the rear brake arms 30, 32, the rear brake cable segments 44, 46, and the dual cable force balancing mechanism 12. The bicycle frame 14 may include a seat post portion 90 as shown in FIG. 1, and the dual cable force balancing mechanism 12 may be disposed between the seat post portion 90 and the rear brake arms 30, 32. It is contemplated that such positioning of the dual cable force balancing mechanism 12 results in the rear brake cable segments 44, 46 having an incident angle with the cable ends 84 of the rear brake arms 30, 32 to be substantially normal for providing a high degree of leverage. Thus, this facilitates that the effective moment arm of the brake arms 30, 32 may be relatively maximized, in comparison to positioning of the dual cable force balancing mechanism 12 at other locations of the bicycle 10.

Figure 4:
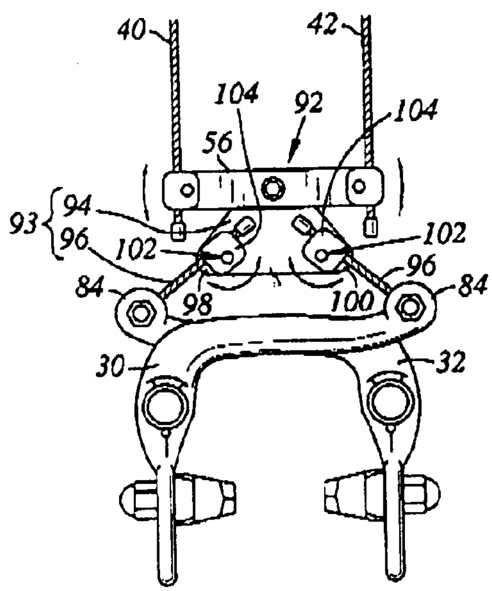
FIG. 4 is a plan view similar to the view of FIG. 3, however, of a dual cable force balancing mechanism according to another aspect of the present invention.

Referring now to FIG. 4 there is depicted a plan view similar to the view of FIG. 3, however of a dual cable force balancing mechanism 92 according to another aspect of the present invention. The dual cable force balancing mechanism 92 is similar in configuration to the dual cable force balancing mechanism 12, however with the differences noted, and like reference numerals indicate like structures. This embodiment contemplates that there is provided rear brake cable segments 96 that are discrete members. In this regard, the dual cable force balancing mechanism 92 includes a hanger body 94 that is configured to engage the rear brake cable segments 96. The dual cable force balancing mechanism 92 may take the form of the brake cable segments 96 and the hanger body 94. The hanger body 94 includes rear attachment portions 98, 100. Fasteners 102 and fittings 104 may be used to respectively clamp the rear brake cable segments 96 to the hanger body 92 at the rear attachment portions 98, 100. The rear brake cable segments 96 may be rotatably coupled to the hanger body 94 as indicated by the double-headed arrows.

Figure 5:
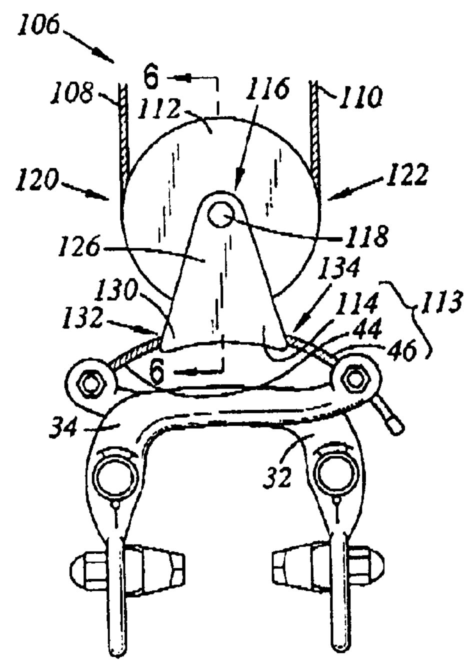
FIG. 5 is a plan view similar to the view of FIG. 3, however, of a dual cable force balancing mechanism according to another aspect of the present invention.
Figure 6:
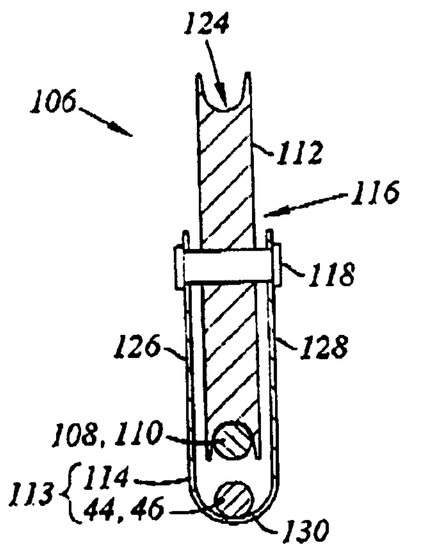
FIG. 6 is a side view of the dual cable force balancing mechanism of FIG. 5 as seen along axis 6—6 of FIG. 5.

Referring now to FIG. 5 there is depicted a plan view similar to the view of FIG. 3, however of a dual cable force balancing mechanism 106 according to yet another aspect of the present invention. FIG. 6 is a side view of the dual cable force balancing mechanism 106 of FIG. 5 as seen along axis 6—6. The dual cable force balancing mechanism 106 is similar in configuration to dual cable force balancing mechanism 12, however with the differences noted, and like reference numerals indicate like structures.

Among other things, this embodiment features that the main brake cable segments 108, 110 are integrated into a single cable. The dual cable force balancing mechanism 106 includes a pivot member 112 rotatably coupled to a hanger body 114, dual cable force balancing mechanism 106 may include a brake arm actuation assembly 113 that includes the hanger body 114. The pivot member 112 may take the form of a pulley. The pivot member 112 includes a central portion 116 and the pivot member 112 is attached to the hanger body 114 at the central portion 116. A fastener 118, such as a pin, may be used to couple the pivot member 112 with the hanger body 114. The pivot member 112 is configured to engage the main brake cable segments 108, 110. In this regard, the pivot member 112 may be configured to engage the main brake cable segments 108, 110 with the main brake cable segments 108, 110 being looped about the pivot member 112. The pivot member 112 includes main attachments portions 120, 122 which are disposed along a radially outward facing peripheral groove 124 (as seen in cross section in FIG. 6). The hanger body 114 may include a pivot member support including first and second plates 126, 128. The pivot member 112 is rotatably connected to and between the first and second plates 126, 128. A lip 130 extends between the first and second plates 126, 128. The lip 130 may be configured to engage the rear brake cable segments 44, 46. The lip 130 includes rear attachment portions 132, 134 of the hanger body 114.

Figure 7:
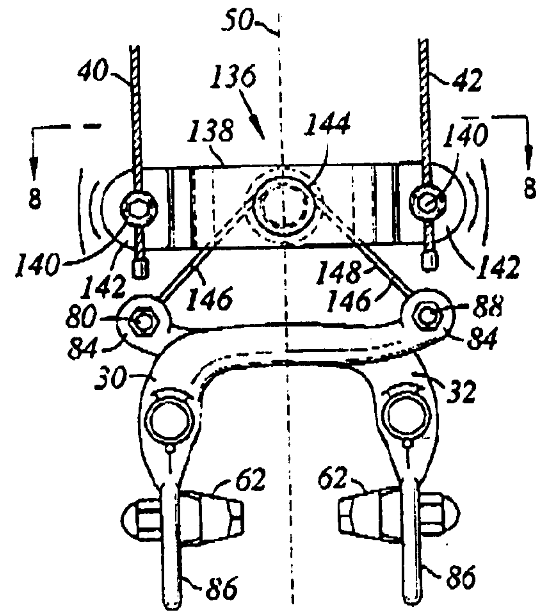
FIG. 7 is a plan view similar to the view of FIG. 3, however, of a dual cable force balancing mechanism according to another aspect of the present invention.
Figure 8:
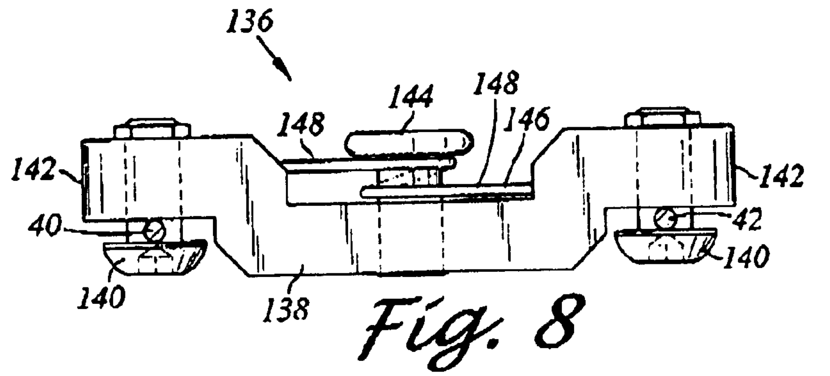
FIG. 8 is a top view of the dual cable force balancing mechanism of FIG. 7 as seen along axis 8—8 of FIG. 5.

Referring now to FIG. 7 there is depicted a plan view similar to the view of FIG. 3, however of a dual cable force balancing mechanism 136 according to yet another aspect of the present invention. FIG. 8 is a top view of the dual cable force balancing mechanism 136 of FIG. 7 as seen along axis 8—8. The dual cable force balancing mechanism 136 is similar in configuration to dual cable force balancing mechanism 12, however with the differences noted, and like reference numerals indicate like structures.

Among other things, this embodiment features a pivot member 138 that may be rotatably coupled to the main brake cable segments 40, 42 as indicated with double-headed arrows. In this regard, the main brake cable segments 40, 42 may pass through rotatable fasteners 140 located at main attachment portions 142, as shown in FIG. 8. It is noted that such rotatable fasteners 140 may be utilized in any of the other embodiments described herein. The pivot member 138 may include a pivot pin element 144 disposed between the main attachment portions 142 and positionable orthogonal to the longitudinal axis 50. In this embodiment, there are provided rear brake cable segments 146 that are integrally formed and are joined at the pivot pin element 144. The rear brake cable segments 146 may be formed of a single spring wire. The rear brake cable segments 146 are cooperatively wound about the pin element 144. In this embodiment, the dual cable force balancing mechanism 136 includes a brake arm actuation assembly 148 that is simply formed of the rear brake cable segments 146. In this form, it is contemplated that the pivot member 138 may rotate with respect to the brake arm actuation assembly 148 about the pivot pin element 144. Advantageously, the use of a spring wire may serve a dual purpose of not only transferring force from the main brake cable segments 40, 42 to the rear brake arms 30, 32, but also may act as a return spring for positioning the rear brake arms 30, 32 prior to and after actuation.

Figure 9:
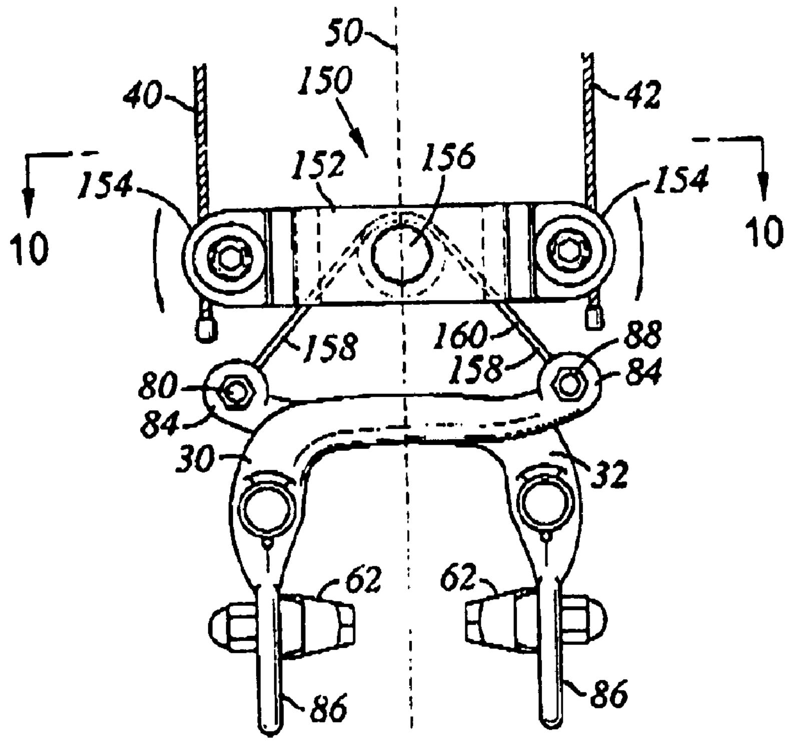
FIG. 9 is a plan view similar to the view of FIG. 3, however, of a dual cable force balancing mechanism according to another aspect of the present invention.
Figure 10:
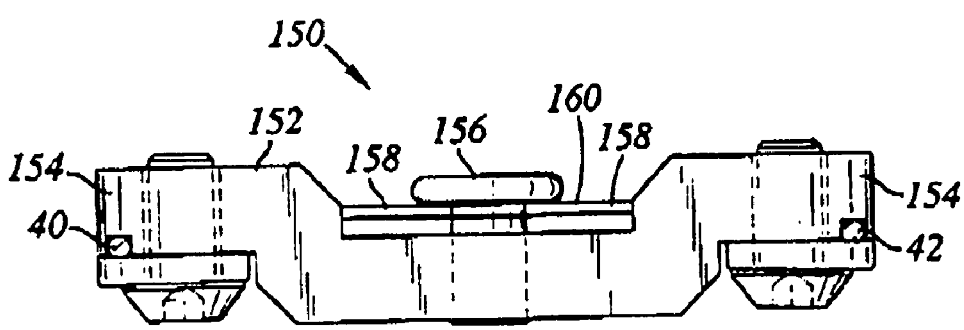
FIG. 10 is a top view of the dual cable force balancing mechanism of FIG. 9 as seen along axis 10—10 of FIG. 9.

Referring now to FIG. 9 there is depicted a plan view similar to the view of FIG. 3, however of a dual cable force balancing mechanism 150 according to yet another aspect of the present invention. FIG. 10 is a top view of the dual cable force balancing mechanism 150 of FIG. 9 as seen along axis 10—10. The dual cable force balancing mechanism 150 is similar in configuration to dual cable force balancing mechanism 12, however with the differences noted, and like reference numerals indicate like structures.

Among other things, this embodiment features a pivot member 152 that may be coupled to the main brake cable segments 40, 42 at main attachment portions 154. The pivot member 152 may include a pivot pin element 156 disposed between the main attachment portions 154 and positionable orthogonal to the longitudinal axis 50. The pivot pin element 156 may be fixed or rotatably attached to the pivot member 152. In this embodiment, there are provided rear brake cable segments 158 that are integrally formed and are joined at the pivot pin element 156. The rear brake cable segments 146 are cooperatively looped over the pivot pin element 156. In this embodiment, the dual cable force balancing mechanism 150 includes a brake arm actuation assembly 160 that is simply formed of the rear brake cable segments 158. In this form, it is contemplated that the pivot member 152 may rotate and be disposed in sliding contact with the brake arm actuation assembly 160 at the pivot pin element 156.

While an illustrative and presently preferred embodiments of the various aspects of the invention have been described in detail herein, it is to be understood that the inventive concepts may be otherwise variously embodied and employed and that the appended claims are intended to be construed to include such variations except insofar as limited by the prior art.

I claim:

1. A dual force balancing mechanism for use with a pair of rear brake arms of a bicycle, the dual force balancing mechanism comprising:

a rear brake lever;

a pair of main brake cable segments in mechanical communication with the rear brake lever;

a brake arm actuation assembly defining a longitudinal axis positionable between the main brake cable segments, the brake arm actuation assembly being attachable to the rear brake arms; and a pivot member including main attachment portions disposed about the longitudinal axis for respectively attaching the main brake cable segments with each main brake cable segment disposed between a respective main attachment portion and the rear brake lever, the pivot member being rotatably coupled to the brake arm actuation assembly for pivoting the pivot member with respect to the longitudinal axis.

2. The dual cable force balancing mechanism of claim 1 wherein the brake arm actuation assembly includes a pair of rear brake cable segments attachable to the rear brake arms, each of the rear brake cable segments is disposed in mechanical communication with the pivot member.

3. The dual cable force balancing mechanism of claim 2 wherein the brake arm actuation assembly includes a hanger body, the hanger body is rotatably coupled to the pivot member, the hanger body includes rear attachment portions respective positionable about the longitudinal axis, the rear brake cable segments are attached to the hanger body respectively at the rear attachment portions.

4. The dual cable force balancing mechanism of claim 3 wherein the hanger body includes a lip with the rear attachment portions disposed along the lip, the rear brake cable segments are integrated into a single cable and the lip is configured to engage the rear brake cable segments with the rear brake cable segments being looped about the lip.

5. The dual cable force balancing mechanism of claim 4 wherein the hanger body includes a pivot member support and the lip extends from the pivot member support.

6. The dual cable force balancing mechanism of claim 4 wherein the hanger body includes a pivot member support, the pivot member support includes first and second plates, the lip extends between the first and second plates, the pivot member is rotatably connected to and between the first and second plates.

7. The dual cable force balancing mechanism of claim 3 wherein the rear brake cable segments are rotatably attached to the hanger body respectively at the rear attachment portions.

8. The dual cable force balancing mechanism of claim 3 wherein the pivot member is a cross bar having opposing ends and a central portion, the pivot member is attached to the hanger body at the central portion, the main attachment portions are respectively disposed adjacent the opposing ends.

9. The dual cable force balancing mechanism of claim 3 wherein the pivot member is a pulley and includes a central portion, the pivot member is attached to the hanger body at the central portion.

10. The dual cable force balancing mechanism of claim 3 further includes a fastener rotatably coupling the pivot member to the hanger body.

11. The dual cable force balancing mechanism of claim 2 wherein the main brake cable segments are integrated into a single cable, the pivot member is configured to engage the main brake cable segments with the main brake cable segments being looped about the pivot member.

12. The dual cable force balancing mechanism of claim 2 wherein the pivot member includes a pivot pin element disposed between the main attachment portions and positionable orthogonal to the longitudinal axis, the rear brake cable segments are joined at the pivot pin element.

13. The dual cable force balancing mechanism of claim 12 wherein the rear brake cable segments are cooperatively looped over the pin element with the pivot pin element.

14. The dual cable force balancing mechanism of claim 12 wherein the rear brake cable segments are cooperatively wound about the pivot pin element.

15. The dual cable force balancing mechanism of claim 14 wherein the rear brake cable segments are formed of a single spring wire.

16. The dual cable force balancing mechanism of claim 1 wherein the pivot member is rotatably attachable to the main brake cable segments.

17. A bicycle comprising:

a bicycle frame;

a rear wheel supported by the bicycle frame;

a rear brake assembly including:

a rear brake lever;

a pair of main brake cable segments in mechanical communication with the rear brake lever;

a pair of rear brake arms in operable communication with the rear wheel; and a dual cable force balancing mechanism including:

a brake arm actuation assembly defining a longitudinal axis positioned between the main brake cable segments, the brake arm actuation assembly being attached to the rear brake arms; and a pivot member including main attachment portions disposed about the longitudinal axis, the main brake cable segments being respectively attached to the pivot member at main attachment portions with each main brake cable segment disposed between a respective main attachment portion and the rear brake lever, the pivot member being rotatably coupled to the brake arm actuation assembly for pivoting the pivot member with respect to the longitudinal axis.

18. The bicycle of claim 17 wherein the dual cable force balancing mechanism includes a pair of rear brake cable segments attached to the rear brake arms, each of the rear brake cable segments is disposed in mechanical communication with the pivot member.

19. The bicycle of claim 17 wherein the bicycle frame includes a seat post portion, the dual cable force balancing mechanism is disposed between the seat post portion and the rear brake arms.

* * * * *